United States Patent

[11] 3,571,508

[72] Inventor Frederik J. Van Roessel
Mahwah, N.J.
[21] Appl. No. 755,578
[22] Filed Aug. 27, 1968
[45] Patented Mar. 16, 1971
[73] Assignee U. S. Philips Corporation
New York, N.Y.

[54] BLANKING AND BLACK LEVEL CONTROL CIRCUIT FOR VIDEO SIGNALS
8 Claims, 2 Drawing Figs.

[52] U.S. Cl. ........ 178/7.1
[51] Int. Cl. ........ H04n 3/24
[50] Field of Search ........ 178/7.1

[56] References Cited
UNITED STATES PATENTS
3,487,162 12/1969 Gordon et al. ........ 178/7.1DC.

*Primary Examiner*—Richard Murray
*Assistant Examiner*—Barry Leibowitz
*Attorney*—Frank R. Trifari

ABSTRACT: A blanking and black level insertion circuit for video signals includes a switch which, during the scan period connects the video source directly to the video output and provides a loop circuit including an amplifier and a shunt capacitor. An external black level control current is inserted in the loop circuit at the output of the amplifier. During the blanking period the loop circuit is opened and the video signal is applied to the video output by way of the amplifier, with the shunt capacitor still connected to the circuit and the black level control current still being inserted at the amplifier output.

Figure 2:
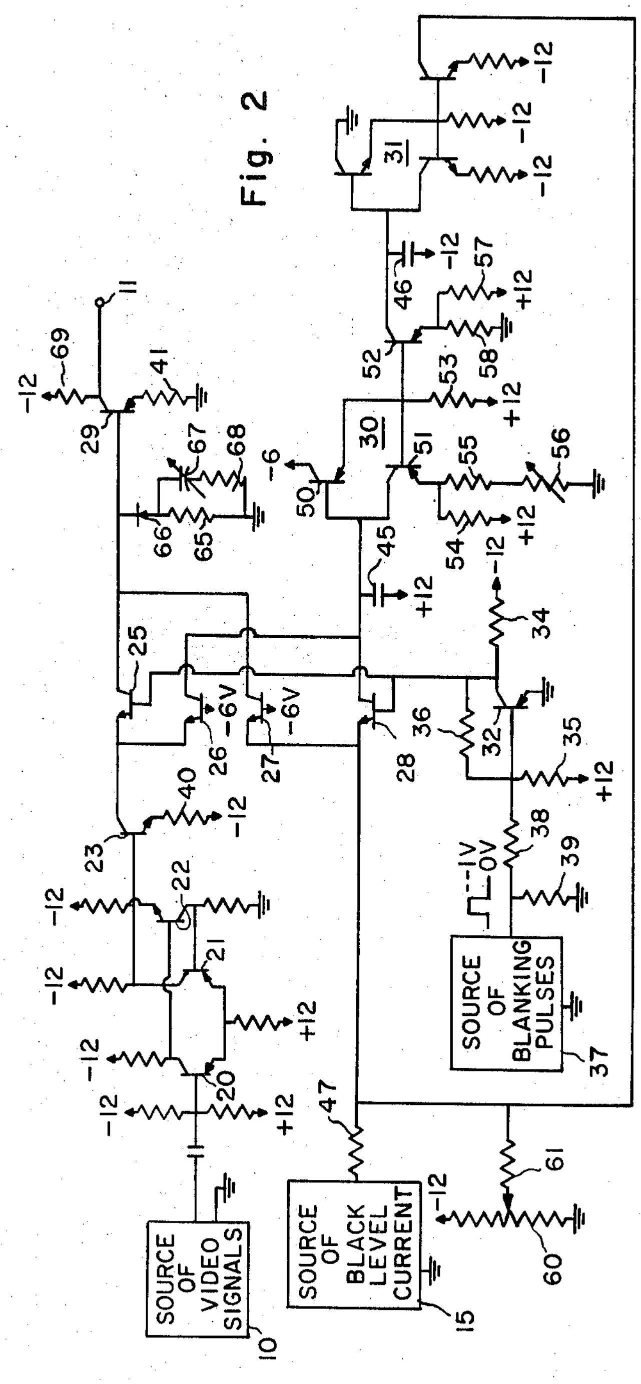

INVENTOR.
FREDERIK J. VAN ROESSEL
BY
Frank R. Jacobs
AGENT

BLANKING AND BLACK LEVEL CONTROL CIRCUIT FOR VIDEO SIGNALS

This invention relates to a blanking and black level current insertion circuit for a video signal, and more in particular to an improved circuit for removing undesired pulses from a television signal during the blanking period, and for setting the direct current level of such a signal to a desired amplitude during this period. While the invention as hereinafter disclosed is of particular use in a television camera system, it will be obvious that the novel aspects of the invention are not so limited in their scope.

In a television camera system, the output of the camera tube is usually first applied to a preamplifier, and the output the preamplifier is applied to a series of signal-processing circuits which provide gain control, introduce shading effects (which control the gain as a function of the position of the signal with respect to the raster), matrix the video signal with other video signals (e.g. in a color television system), provide black and white clipping, introduce gamma corrections, and modulate the video signals in an encoder. In order to function properly, the signal-processing circuits require that the black level of the signals during the blanking period is accurately maintained, and that noise is eliminated from he signals during this period.

The output signal of the camera tube, which may, for example, be a plumbicon, usually does not satisfy these requirements. Noise and spurious pulses contaminate the signal during the blanking period, and the output of the tube during this time may not accurately represent the true signal black level due, for example, to "stray light" effecting current flow in the camera tube. It is thus necessary to remove the undesireable variations in the signal during black level, and to introduce a signal or correct the signal during the blanking period so that it accurately represents the signal black level (or any desired variation therefrom). Past circuits have been provided to remove noise and spurious pulses during the blanking period, but such circuits have not provided the desired control of the black level as a function of the actual video black level and an external current, and improvements have been desired in the removal of the noise and spurious pulses.

According to the present invention, these problems are obviated by providing a commutating means, such as an electronic switch, that passes the input video signal directly to the output video circuit during the scan period, and during this interval establishes a loop circuit including an amplifier and a shunt capacitor. A controllable source of black level current is introduced in the loop circuit preferably at the output of the amplifier. During the blanking period, the commutating means opens the loop circuit and diverts the video signal so that it passes through the amplifier before being applied to the video output circuit. The shunt capacitor serves to remove noise and spurious pulses from the signal, and the black level current inserted at the amplifier output adjusts the signal direct level to the desired amplitude. The gain of the amplifier is adjustable so that the desired proportion of the input video signal black level is present in the signal at the video output circuit.

While the specification concludes with claims particularly pointing out and distinctly claiming the subject matter of the invention, it is believed that the invention will be better understood from the following description taken in connection with the accompanying drawing.

Figure 1:
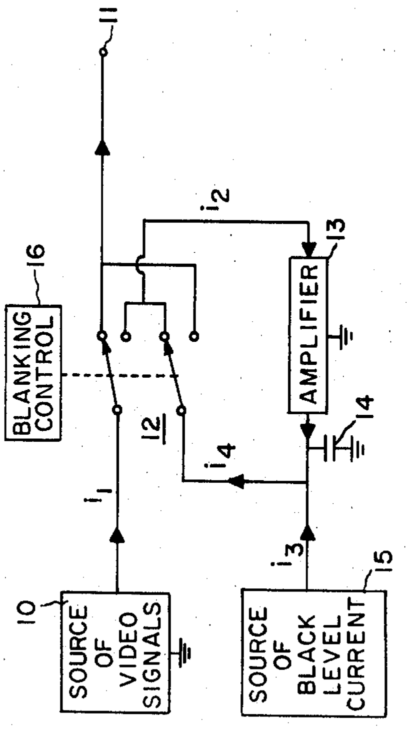

In the drawing:

FIG. 1 is a block diagram of a blanking and black level system according to the invention; and FIG. 2 is a schematic diagram of one embodiment of a circuit according to the system of FIG. 1.

Referring now to the drawings, and more in particular to FIG. 1, a video signal from a source 10 is applied to an output terminal 11 by way of one pair of normally closed contacts of a switch 12, and the input and output of an amplifier 13 are connected together to form a loop circuit by way of another pair of normally closed contacts of switch 12. A point on the loop circuit, for example at the output of the amplifier, is connected to a point of reference potential by way of capacitor 14. A source of black level current 15 is also connected to the loop circuit at the output of the amplifier. The normally closed position of the switch 12 corresponds to he scan period of the video signal.

During the blanking period of the video signal, a blanking control device 16 operates the switch 12 to interrupt the loop circuit, to connect the video signal source to the input of the amplifier, and to connect the output of the amplifier to the output terminal 11. This operation connects the capacitor 14 in shunt with the video signal during blanking in order to remove noise and spurious pulses from the video signal, and to inject current from the black level source 15 into the video channel to establish the desired black level.

In analyzing the circuit of FIG. 1, assume that the source 10 of a video signal produces a current $i_1$, the source of black level current 15 produces a current $i_3$, the input current of the amplifier 13 is $i_2$, and the sum of the black level current and the output current of the amplifier (and the current of capacitor 14 if it is connected to the output of the amplifier) is $i_4$. The current $i_2$ is thus equal to $i_4$ and is the loop current during the scan period of the video signal and the current $i_2$ is equal to the video current $i_1$ during the blanking period. The current $i_4$ is the current applied to the output terminal 11 during the blanking period. Assuming that the current $i_4$ is the same during the scan and blanking periods, it can be shown that:

$$\underline{i_4}=\frac{\underline{i_3}+\frac{1}{K+1}A\underline{i_1}}{1-\frac{KA}{1+K}} \quad (1)$$

where A is the gain of amplifier 13, and $k$ is the ratio of the scan time to the blank time of the blanking is ⅛, then $k = 7$ and:

$$\underline{i_4}=\frac{i_3+\frac{1}{8}Ai_1}{1-\frac{7}{8}A} \quad (2)$$

These relationships illustrate the affect of the various parameters of the circuit upon the current applied to he output terminals during the blanking period. Thus, if the gain of the amplifier is unity, $i_4 = (1 + K)\ i_3 + i_1$, from which it is apparent that the current applied to the output terminal during blanking to establish a desired black level can readily be controlled by controlling the current from the black level current source 15.

Control of the gain of amplifier 13 also serves a useful function, since the amount of the current $i_1$ applied to the output terminals during blanking is a function of the amplifier gain. Thus, if the gain is unity, the complete direct current component of the video signal during blanking is applied to the output terminals, while if the gain of the amplifier is zero, the direct current component of the video signal is lost during blanking. While the amplifier gain also effects the current from source 15 applied to the output terminals, its effect on this current is smaller than on the video signal current. In some video systems, an undesirable current may be present on the signal during the blanking period. This current may arise, for example due to small currents due to stray light in a camera tube. The effect of such currents on the black level of the video signal may be cancelled by adjusting the gain of the amplifier and thereby reducing the proportion of the current $i_1$, which appears at the output terminal 11. After adjustment of the amplifier gain, the source 15 of black level current is adjusted to provide the desired black level.

It is thus apparent that the circuit in FIG. 1 removes noise and spurious pulses from the video signal during the blanking period, provides means for controlling the proportion of direct current in the video signal that is retained during blanking, for example, to provide stray light compensation, and provides an accurate and controllable black level for the signal.

A more complete example of a blanking and black level control circuit according to the invention is illustrated in FIG. 2. In this circuit the video signal from source 10 is applied to the base of transistor 20 which is connected, with transistor 21, as a differential amplifier. Negative feedback for this circuit, in order to improve stability of the amplifier, is provided by means of a transistor 20 and its collector connected to the base of transistor 21. The output of the differential amplifier at the collector of transistor 21 is connected to the base of transistor 23, which then serves as a current source for the video signal.

The switch 12 of FIG. 1 is replaced in the circuit of FIG. 2 by four NPN transistors 25, 26, 27 and 28. The collector of transistor 23 is connected to the emitters of switch transistors 25 and 26. An output amplifier stage is provided including a common emitter connected transistor 29 having its collector connected to the collectors of switch transistors 25 and 27. The amplifier 13 of FIG. 1 is replaced by two cascade connected amplifier stages 30 and 31, with the input of amplifier 30 being connected to the collectors of switch transistors 26 and 28, and the output of amplifier 31 being connected to the emitters of switch transistors 27 and 28. In the arrangement of FIG. 2, the bases of switch transistors 26 and 27 are connected to voltage sources of −6 volts, and the bases of switch transistors 25 and 28 are connected to the collector of a PNP transistor 32 of a blanking control circuit 33.

The blanking control circuit comprises a resistor 34 connected between the collector of transistor 32 and a −12-volt source, a resistor 35 connected between the base of transistor 32 and a +12-volt source, and a resistor 36 connected between the emitter and base of transistor 32. The emitter of transistor 32 is connected to ground reference. A source 37 of blanking pulses is connected to the base of transistor 32 by way of a resistive network of series resistor 38 and shunt resistor 39. The source 37 produces pulses of about one volt during the blanking period, and the output of this source is at ground level during the remainder of its cycle. The bias resistors of transistor 32 are cut off during the blanking period. Consequently, the collector voltage of transistor 32, and hence the base voltage of switch transistors 25 and 28, is higher than −6 volts (e.g. at about −4.5 volts) during the scan period, and is less than −6 volts (e.g. about −7.5 volt) during the blanking period.

The emitter of NPN transistor 23 is connected to a −12-volt supply by way of resistor 40, and the emitter of PNP output transistor 29 is connected to ground reference by way of a resistor 41. The base of transistor 29 is also connected to ground by way of diode 66 and resistor 65. During the scan period the base of switch transistor 25 is more positive than the base of transistor 26, and consequently transistor 26 is cut off and a current path for the video signal is established from the −12-volts supply to the +12-volts supply by way of resistor 40, the emitter-collector paths of transistors 23 and 25, diode 66 and resistor 65. The resistor 65 has the same value as resistor 41, so that the emitter-collector current of transistor 29 will be substantially equal to the collector current of transistor 23. Similarly, during the scan period transistor 27 is cut off, and amplifiers 30 and 31 are connected in a loop circuit by way of the emitter-collector path of transistor 28. During the blanking period the conductivities of the switch transistors are reversed, so that the video signal form transistor 23 is applied by way of the emitter-collector path of transistor 26 to cascade connected amplifiers 30 and 31, and thence to output amplifier transistor 29 by way of switch transistor 27. At this time transistors 25 and 28 are cut off.

The capacitor 14 of FIG. 1 is replaced, in the circuit of FIG. 2, by a capacitor 45 connected between the input of amplifier 30 and the +12-volt supply, and a capacitor 46 connected between the input of amplifier 31 and the −12-volt supply. These two capacitors serve the same function as the capacitor 14 of FIG. 1.

In the circuit of the invention it is essential that the gain of the amplifiers 30 and 31 be very stable. In the arrangement of the above formula (2), for example, it is seen that one percent change in the direct current loop gain can affect the level of inserted blanking by about 8 percent. A suitable amplifier for this purpose (i.e. amplifier 30), includes PNP transistors 50, 51, and 52. The input of the amplifier is connected to the base of transistor 50 and the bases of transistors 51 and 52 are connected to the +12-volt supply by way of resistor 53, and the collector of transistor 50 is connected to the −12-volt supply. The emitter of transistor 11 is connected to the +12-volt supply by way of resistor 54, and the ground reference by way of series connected resistor 55 and variable resistor 56. The emitter of transistor 52 is connected to the +12-volt supply by way of resistor 57, and to ground reference by way of resistor 58. The output of the amplifier is at the collector of transistor 52.

Amplifier 30 as described above functions as a current source that isolates its output current from its input current. The input current flows primarily in the emitter-collector path of transistor 51, and the output current is the emitter-collector of transistor 52. Transistor 50 is connected to maintain a current balance between the currents of transistors 51 and 52. The base current of transistor is an extremely small, and hence negligible portion, of the input current, since it is in the order of twice the inverse of the produce of the beta factors of transistors 50 and 51 times the collector current of transistor 51. The ratio of currents between transistors 51 and 52 is a function of the ratio of the emitter impedances of these transistors, and hence the gain of the amplifier can be conveniently varied by the variable resistor 56 without affecting the direct voltage level.

Amplifier 31 is fabricated in the same manner as amplifier 30, with the exception that the transistors of the amplifier 31 are of the opposite conductivity type and are provided with opposite polarity voltages in order to facilitate direct coupling throughout the loop circuit. In addition, amplifier 31 is not provided with a variable gain control. The emitters of the transistors are connected directly to a −12-volt supply by way of fixed resistors.

The source 15 of black level current is connected to the emitters of transistors 27 and 28 by way of resistor 47. This source may be a remote controlled source. If local control of the black level is desired, this may be provided by means of a potentiometer 60 connected the tap the −12-volt supply and ground, the tap of potentiometer 60 being connected to the emitters of transistors 27 and 28 by way of resistor 61.

The diode 66 in the base circuit of the output amplifier stage also provides temperature compensation. An adjustable frequency compensation capacitor 67 in series with resistor 68 is connected in parallel with resistor 65. The collector circuit of transistor 29 includes output resistor 69 connected for the −12-volts source.

In one successful embodiment of the circuit of FIG. 2, the following components were employed:

| | |
|---|---|
| Transistor 23 and the transistors of Amplifier 31 | MPS 6521 |
| Transistors 29, 32, 50, 51 and 52 | MPS 6523 |
| Transistors 25–28 | (1) |
| Resistor: | |
| 34 | 2.7 KΩ |
| 35 | 36 KΩ |
| 36 | 4.7 KΩ |
| 38 | 2.2 KΩ |
| 39 | 82 Ω |
| 40 | 1.1 KΩ |
| 41 | 470 Ω |
| 47 | 160 KΩ |
| 53 | 150 KΩ |
| 54 | 4.3 KΩ |
| 55 | 27 KΩ |
| Variable Resistor 56 | 100 KΩ |
| Resistor: | |
| 57 | 4.3 KΩ |
| 58 | 100 KΩ |
| Potentiometer 60 | 25 KΩ |

| | |
|---|---|
| Resistor: | |
| 61 | 100 KΩ |
| 65 | 470 Ω |
| 69 | 1. 1 KΩ |
| Capacitor: | |
| 45 | 100 μf |
| 46 | 0. 68 μf |

[1] Amperex TAB-101.

It will be understood, of course, that while the form of the invention herein shown and described constitutes the preferred embodiment of the invention, it is not intended herein to illustrate all of the equivalent forms of ramifications thereof. It is thus obvious that many modifications may be made without departing from the spirit or scope of the disclosed invention, and it is aimed in the appended claims to cover all each changes as fall within the true spirit and scope of the invention.

I claim:

1. A blanking an black level insertion circuit for a video signal of the type having periodic scan and blanking periods, comprising a source of said signal, an output circuit, direct current amplifier means, commutating means synchronized with said signal and having a first position during said scan periods for connecting said source of a signal to said output circuit and for interconnecting the input and output of said amplifier means to form a loop circuit, said commutating means having a second position during said blanking periods for interrupting said loop circuit and connecting said source to aid output circuit by way of said amplifier means, said blanking and black level circuit further comprising capacitor means connected between a point of reference potential and a first point on the loop circuit which is formed during said blanking periods, a source of black level control voltage, and means connecting said source of control voltage to a second point on said loop circuit which is between the output of said amplifier and said output circuit during said scan intervals.

2. A blanking and black level insertion circuit for a video signal of the type having periodic scan and blanking periods, comprising a source of said video signal, an output circuit, direct current amplifier circuit means, commutating means having first position connecting said source to said output circuit and interconnecting the input and output of said amplifier means to form a loop circuit, and a second position interrupting said loop circuit and connecting said source to said output circuit by way of said amplifier means, capacitor means, means connecting said capacitor means between said amplifier means and a point of reference potential whereby said capacitor means bypasses said video signal when said commutating means is in its first position, a source of black level current, means applying said black level current to the output of said amplifier means whereby said black level current circulates in said loop circuit when said commutating means is in its second position and is applied to said output circuit when said commutating means is in its first position, and control means connected to said commutating means and synchronized with said video signal whereby said commutating means is in said first position during said scan periods and is in said second position during said blanking periods.

3. The circuit of claim 2 wherein said commutating means comprises a first transistor having its emitter-collector path connected between aid source of a signal and said output circuit, a second transistor having its emitter-collector path connected between said source of a signal and the input of said amplifier means, a third transistor having its emitter-collector path connected between the output of said amplifier means and said output circuit, and a fourth transistor having its emitter-collector path connected between the output and input of said amplifier means.

4. The circuit of claim 3 wherein said control means comprises a source of blanking pulses, means applying said blanking pulses to the base of one of said transistors connected to said source of signals and to the base of one of said transistors connected to the output of said amplifier means, and means applying bias potentials to the bases of the remaining transistors whereby said first and fourth transistors are conductive during said scan periods and said source and third transistors are conductive during said blanking periods.

5. The circuit of claim 3 wherein said first, second, third and fourth transistors are of one conductivity type, said source of signal comprises a fifth transistor of he same conductivity type having its collector connected only to the emitter of aid first and second transistors, means applying said signal to the base of said fifth transistor, and means connecting the emitter of said fifth transistor to a point of constant potential, and said output circuit comprises a sixth transistor of opposite conductivity type connected as a common emitter amplifier with its base connected to the collectors of said first and third transistors.

6. The circuit of claim 2 wherein said amplifier means comprises an amplifier having an input terminal, an output terminal a first transistor of one conductivity type having its collector connected to said input terminal, a second transistor of the same conductivity type having its collector connected to aid output terminal, a third transistor of the same conductivity type having its base connected to aid input terminal and its emitter connected to the bases of said first and second transistors, means connecting the collector of said third transistor to a point of constant potential, and separate resistor means connecting the emitters of said first and second transistors to at least one point of constant potential.

7. The circuit of claim 6 wherein at least one of said resistor means comprises a voltage divider connected between two different points of constant potential and having a tap connected to the emitter of the respective transistor, said voltage divider being variable whereby the gain of said amplifier can be varied.

8. A circuit for blanking and black level insertion of a video signal of the type having scan periods and blanking periods, comprising a source of said signal, an output circuit, means connecting said source of said signal to said output circuit, a loop circuit including direct current amplifier means and means interconnecting the input and output of aid amplifier means, a source of black level current, means applying said black level current to said loop circuit between the input and output of said black means, capacitor means, means connecting said capacitor means between a point of said loop circuit an a point of reference potential, and commutating means connected to interrupt said loop circuit and connect said source of said signal to said output by way of said amplifier means during said blanking periods, whereby said capacitor bypasses said video signal and said black level current is applied to said output circuit directly during said blanking periods.